No. 738,388. Patented September 8, 1903.

UNITED STATES PATENT OFFICE.

WILLIAM A. OTTO WUTH, OF PITTSBURG, PENNSYLVANIA, ASSIGNOR TO INTERNATIONAL CEMENT COMPANY, A CORPORATION OF NEW JERSEY.

MANUFACTURE OF CEMENT.

SPECIFICATION forming part of Letters Patent No. 738,388, dated September 8, 1903.

Application filed June 24, 1902. Serial No. 113,021. (No specimens.)

*To all whom it may concern:*

Be it known that I, WILLIAM A. OTTO WUTH, a resident of Pittsburg, in the county of Allegheny and State of Pennsylvania, have invented a new and useful Improvement in the Manufacture of Cement, (Case No. 1;) and I do hereby declare the following to be a full, clear, and exact description thereof.

My invention relates to the manufacture of a cement similar to that known as "Portland" cement.

In my Patent No. 643,856, granted February 20, 1900, I have described and claimed a process of forming cement from blast-furnace slag, the process consisting, essentially, in hydrating burned lime with water containing a soluble salt which will evolve oxygen at a high temperature, then mixing the hydrated lime with powdered blast-furnace slag, and thereafter burning the mixture. In that patent it was pointed out that the usual ingredients of Portland cement are found in a proper admixture of lime and blast-furnace slag. The object of the process claimed in the patent was to eliminate the sulfur from the blast-furnace slag or, in other words, to reduce it from a sulfid to a harmless sulfate.

The object of the present application is to claim a modification of the process described in the patent aforesaid, and the essential feature of the modification consists in using limestone in place of lime, thereby obviating the necessity of burning the lime and the frequent handlings incident thereto. The final burning of the mixture will not only reduce the calcium carbonate of the limestone to lime or calcium oxid, but will also produce a trisilicate of lime, which is the essential ingredient of the cement. In this manner a single burning only need be employed.

In practicing the invention the essential object to be secured is a thorough commingling of the limestone, the slag, and the salt which evolves oxygen at a high temperature to eliminate the sulfur. As a much more uniform mixture can be secured by applying the salt which is to evolve oxygen at the high temperate as a liquid solution, I prefer to follow that method, and consequently the salt, preferably sodium nitrate, or other salt of a similar nature will be dissolved and the other ingredients will be treated therewith. Preferably this solution will be added to the limestone, and the latter will then be ground, the grinding being a wet process. The slag preferably will be in powdered form, such as now comes from blast-furnaces; but should it not be powdered it will first be ground, and this grinding may take place simultaneously with the grinding of the limestone. In any event after the limestone is ground in the wet state it will have added thereto powdered blast-furnace slag, and the whole will then be thoroughly agitated to get an intimate mixture of the various ingredients. The proportion of limestone to slag will depend upon the analysis of the slag; but care will be exercised to secure the proper proportion of lime to silica. A suitable proportion of ingredients will be from two and one-half to four pounds of nitrate of soda, one hundred pounds of slag, and from one hundred to one hundred and ten pounds of limestone, together with sufficient water to dissolve the nitrate of soda. After these ingredients have been thoroughly mixed they will be burned in the usual way employed in the manufacture of ordinary cement, being either burned in powdered form or molded in bricks, as may be considered best, and being subjected to a very high heat for a number of hours. The heat must be sufficiently high to cause a combination between the lime and slag to produce the trisilicate of lime, and this usually requires close to 3,000° Fahrenheit. At a somewhat lower temperature the nitrate of sodium will be broken down and the oxygen freed. This will convert the sulfid of calcium into a harmless sulfate of lime. The soda present will of course become part of the cement, and this is of considerable advantage, because, as a rule, the slag is low in soda, and all cement should contain not less than one per cent. of this element. This quantity is supplied by the nitrate of sodium. In the burning also the calcium carbonate or limestone is converted into calcium oxid.

By following the process above enumerated I am able to produce a cement of high grade, similar to Portland cement, and it is found to contain about twenty-three per cent. of silica, sixty-one per cent. of lime, nine per cent. of alumina, one and one-half per cent. of soda, small proportions of peroxid of iron, manganese, and magnesia, and only nine-tenths per cent. of sulfur, which is present as a harmless sulfate of lime. The cement produced in this way will of course vary in proportion to the ingredients of the slag and the proportion of lime and nitrate of sodium added. The cement, however, will be fairly uniform, as the slag from modern blast-furnaces varies but little in composition. The cement will have all of the favorable qualities enumerated in my patent above referred to, and as the original burning and handling of the limestone and lime are dispensed with it can be manufactured very cheaply, the cost of grinding the limestone not quite compensating for the cost of burning and handling the lime.

It will be understood, of course, that other soluble salts which evolve oxygen at a high temperature may be employed in place of the nitrate of sodium, and all of the various salts enumerated in my previous patent are also adapted for carrying out the present process. The nitrate of sodium is preferred by reason of its cheapness and also for the reason that it increases the proportion of soda in the cement.

I am aware that it has been proposed to make cement by pulverizing and mixing together limestone or lime and blast-furnace slag and thereafter treat the material with an aqueous solution of an alkali salt; but I am not aware that it has ever been proposed to treat the limestone with a salt which will evolve oxygen at a high temperature and then grind the limestone, after which it is mixed with powdered blast-furnace slag and burned.

What I claim as my invention, and desire to secure by Letters Patent, is—

1. The herein-described process of forming cement which consists in treating limestone with a salt which will evolve oxygen at a high temperature, grinding the same, thereafter mixing the same with powdered blast-furnace slag and then burning the mixture.

2. The herein-described process of forming cement which consists in treating limestone with a solution of a nitrate salt, grinding the same, thereafter mixing the ground mass with powdered blast-furnace slag, and then burning the mixture.

3. The herein-described process of forming cement consisting in treating limestone with a solution of nitrate of sodium, grinding the same, thereafter mixing the ground mass with powdered blast-furnace slag, and then burning the mixture.

In testimony whereof I, the said WILLIAM A. OTTO WUTH, have hereunto set my hand.

WILLIAM A. OTTO WUTH.

Witnesses:
ROBERT C. TOTTEN,
F. W. WINTER.